COLOR IMAGE REPRODUCTION APPARATUS

Filed June 1, 1955 4 Sheets-Sheet 1

INVENTOR.
LESLIE L. BURNS, JR.
BY
Glen V. Mitchell
ATTORNEY

INVENTOR.
LESLIE L. BURNS, JR.
BY [signature]
ATTORNEY

INVENTOR.
LESLIE L. BURNS, JR.
BY Olin V. Mitchell
ATTORNEY

INVENTOR.
LESLIE L. BURNS, JR.
BY Olin V. Mitchell
ATTORNEY

United States Patent Office 2,840,635

Patented June 24, 1958

2,840,635

COLOR IMAGE REPRODUCTION APPARATUS

Leslie L. Burns, Jr., Princeton, N. J., assignor to Radio Corporation of America, a corporation of Delaware Application June 1, 1955, Serial No. 512,426

9 Claims. (Cl. 178—5.4)

The present invention relates to new and improved color television image reproduction apparatus and, particularly, to apparatus of the type employing a cathode ray tube of the so-called horizontal "line screen" variety.

Among the forms of color television image reproducing apparatus proposed thus far is one which includes a cathode ray kinescope having a target screen made up of a plurality of groups of strip-like elements adapted to emit light of respectively different colors in response to electron beam impingement. In the case of such a tube, means are provided for causing a plurality of electron beam components to scan a raster pattern on the screen, the raster comprising a plurality of horizontal line scans separated from each other vertically but being in the direction parallel to the groups of strip-like elements. Means are provided additionally to insure tracking of the groups of color elements by the electron beam components in an orderly sequence so that the video signals representative of the respectively different component colors of the image being televised are actually employed in controlling the intensity of the beam component intended to eliminate a given color producing element. Such means, which may be considered as partaking of the nature of a servo mechanism, may employ, for example, special elements (e. g., ultra-violet light emitting material) associated with the target screen for sensing the vertical position of the beam components and for providing indications thereof and means responsive to such indications for correcting the vertical position of the beam components with respect to the screen.

As is well known, television standards provide for the use of interlaced fields (i. e., vertical interlace) for the purpose of increasing vertical resolution of the reproduced image. That is to say, television pictures are transmitted as frames, each frame consisting of two fields, the lines of one field being interdigitated with those of the other field. In the case of horizontal line screen color kinescopes, the matter of vertical interlace has either been treated through the use of relatively complicated circuitry or ignored.

It is, therefore, a primary object of the present invention to provide new and improved color image reproduction apparatus of the horizontal line screen tube variety, which apparatus includes means for effecting vertical interlace of the television fields.

Another object of the invention is that of providing, in apparatus of the types set forth, means for "forcing" the beam components of a kinescope to interlace vertically.

In general, the present invention provides color image reproducing apparatus which includes a kinescope having means for directing a plurality of electron beam components toward a luminescent screen made up of a plurality of groups of strip-like elements such as phosphor strips which are adapted to emit light of respectively different colors upon electron impingement. Associated with the groups of strip-like elements are tracking index signal producing strips or elements (e. g., ultra-violet light emitting material) which are arranged in a regular, repetitive pattern and in a fixed relationship with respect to the strip-like elements of a given color.

In accordance with the invention, certain index elements have different response characteristics from the intervening index elements and, specifically, the response characteristics of the index elements differ in that the ultra-violet light index signals produced by electron impingement thereon are delayed different amounts by successive ones of the index elements. Tracking means responsive to the tracking index signals are included for causing the beam components to scan along predetermined paths, said tracking means being of such character as to cause the beam components to skip, during a field interval, alternate ones of the successive groups of lines, so that, on the next succeeding field scansion, the electron beam components are caused to scan along paths including those lines skipped during the preceding field. In this manner, vertical interlacing is effected in a simple but certain fashion. It should be understood that, as used herein, the term "beam components" includes a plurality of separate electron beams or, for example, a single electron beam which is cyclically deflected, as through a wobbling path, so that it successively impinges upon different ones of the color phosphor elements.

Additional objects and advantages of the present invention will become apparent to those skilled in the art from a study of the following detailed description of the accompanying drawing, in which.

Figures 1, 2:
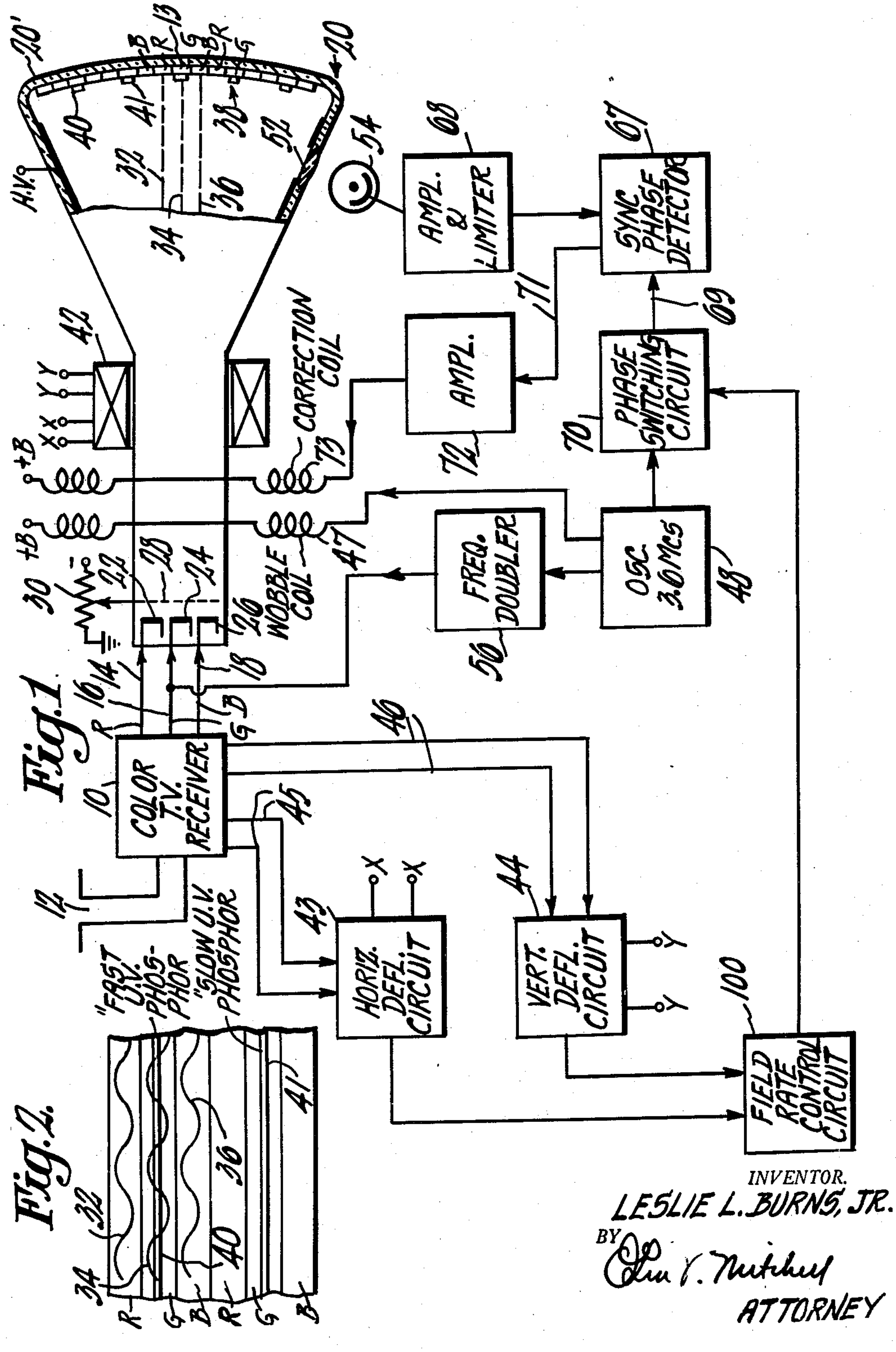
Fig. 1 illustrates, by way of block diagram, a color television receiver embodying one form of the invention.
Fig. 2 is an enlarged, fragmentary view of the luminescent screen of the apparatus of Fig. 1 illustrating certain electron beam paths to be described.

Referring to the drawing and, particularly, to Fig. 1 thereof, there is shown a color television receiver 10 adapted to receive composite television signals which are intercepted by an antenna 12. Since the form of signals and the receiver required to operate thereupon do not constitute a part of the present invention, it is sufficient to note that the receiver 10 provides, at its output terminals 14, 16, and 18, video signals representative, respectively, of the instantaneous brightness of the red, green and blue content of the television subject. Such video signals are produced initially by the scansion of a subject in a line-by-line and field-by-field manner, means being provided for deriving separate video signals respectively indicative of the selected component colors of the subject. By way of example, the receiver 10 may be adapted to process signals of the variety standardized by the Federal Communications Commission, December 17, 1953. Circuitry suitable for deriving simultaneous red, green and blue signals may be found, for example, in the book entitled "Practical Color Television for the Service Industry," revised edition, April 1954 (second edition, first printing), published by the RCA Service Company, Inc., a Radio Corporation of America subsidiary.

The selected component color signals are applied in the following manner to a color image reproducing kinescope 20: the red video signal appearing at the lead 14 is applied to a cathode 22 of the kinescope and the green and blue video signals are similarly applied to the cathodes 24 and 26. A control electrode 28, which may be common to all three cathodes, is connected adjustably to a potentiometer 30 which serves to set the direct current bias on the tube as a background control. The cathodes 22, 24 and 26 produce, respectively, electron beams 32, 34, and 36 which are directed toward a target screen 38 made up of a plurality of groups of horizontally disposed cathodo-luminescent phosphor strips adapted to emit red, green and blue light in response to electron beam impingement. Index signal producing elements 40 and 41 of cathodo-luminescent ultra-violet light emitting phosphor material are associated with the color phosphor strips in a symmetrical fashion. The strips 40 and 41 are chosen, respectively, of materials having respectively different delay characteristics with respect to electron impingement in a manner to be described more fully hereinafter. At this point, it may be noted that each group of color phosphor strips is in the sequence R, G, B. Alternate groups of color phosphor strips have associated therewith ultra-violet light emitting strips 40, while the intervening groups of color phosphor strips have associated therewith ultra-violet light emitting strips 41. The arrangement of the color and ultra-violet phosphor strips of the screen 38 may be better understood from the showing of Figure 2 which also illustrates the respective paths of the electron beams 32, 34 and 36. The beam paths are, in the interest of simplicity, designated by the same reference numerals as those which indicate the electron beams themselves.

The beams are caused to scan a raster made up of a plurality of horizontal line scansions by means of electromagnetic deflection fields produced by a conventional deflection yoke 42 which is supplied with horizontal and vertical sawtooth currents from the circuits 43 and 44, respectively. The deflection circuits 43 and 44 are caused to operate at television line and field frequency (e. g., approximately 15,750 C. P. S. and 60 C. P. S.) by means of synchronizing signals derived from the received signals and applied to the deflection circuits via the leads 45 and 46. Additionally, and as shown in Figure 2, the beams are subjected to an auxiliary deflection force which causes them to travel along undulating or sinusoidal paths during their horizontal scanning movements. The beams are caused to undulate or wobble in this fashion by means of an auxiliary vertical deflection winding 47 designated "wobble coil" in the drawing which is energizing from a suitable source of current illustrated as an oscillator 48 which provides a 3.6 mcs. sine wave.

A window 52, transparent to ultra-violet light, is provided in the conical portion of the kinescope 20 so that ultraviolet light from the strips 40 and 41 resulting from electron impingement thereon may pass to a light responsive phototube 54 which may, for example, be of the photomultiplier type. A tag signal useful in identifying that particular one of the three electron beams which is intended to control the position of the three beams, is applied, for example, to the "green" electron beam. In accordance with the specific embodiment of the invention shown in Figure 1, the tag signal frequency is derived through the agency of a frequency doubler 56 which multiplies the frequency of the output wave of the oscillator 48 by a factor of 2 to produce a continuous 7.2 mcs. wave. That is to say, the frequency doubler may be a harmonic generator arrangement, by which is meant, for example, an amplifier tube circuit having connected in circuit with its anode a tuned circuit whose resonant frequency is twice that of the frequency of the oscillator 48. A selected phase of the 7.2 mcs. wave from the frequency doubler 56 is applied via the lead 58 to the cathode 24 of the kinescope. In this manner, the electron beam 34 is intensity modulated by the tag signal at a 7.2 mcs. rate.

Figure 3*a* illustrates the tag wave 59 on the same time scale as the wobble path or wave 34 described by the electron beam designated by that reference numeral. The intensity of the electron beam as it follows the path 34 will be understood, therefore, as being a maximum at the point indicated by the dots 59'.

In the interest of completeness of description, it may be noted that the color light emitting phosphor strips R, G and B may be deposited directly upon the rear surface of the end wall 20' of the kinescope 20. A layer of aluminum may then be provided in a known manner over the rear of the phosphor strips R, G and B and the ultra-violet light emitting index signal strips 40 and 41 may be applied to the rear surface of the aluminum layer.

Prior to describing the additional apparatus of Fig. 1, further mention will be made of the characteristics of the index signal elements 40 and 41 which are, as has been described, ultra-violet light emitting phosphors having different delay characteristics. By "delay" is meant the fact that the cathodo-luminescent material is emitting light at a time after the cessation of excitation by electron impingement.

One manner in which delay of the type in question may occur is in employing a phosphor having a certain degree of persistence. Persistence is that quality which is due to the fact that the phosphor material has a finite decay time, in addition to its build-up time. That is to say, and as is known, certain luminescent phosphors, once excited by electrons, will continue to emit light for a time after cessation of excitation and in a generally non-linear fashion. For example, a given phosphor material may have a decay characteristic proportional to the following expression:

$$Ae^{-Kt}$$

where A is the amplitude (i. e., brightness of the light output), $e$ is the base of the naperian logarithm, K is a constant and $t$ is representative of elapsed time. Thus, the "time constant" of the phosphor decay is $1/K$, so that it may be seen that K is of the order of $\frac{1}{2}\pi f_c$ where $f_c$ is the frequency of the steady state component exciting energy (i. e., the electron beam current) at which the amplitude response of the phosphor is equal to 0.707 times its response at very low frequency. It is also the frequency at which the phase of the brightness or amplitude modulated light output of the phosphor lags that of the energy input by 45°.

Figure 4:
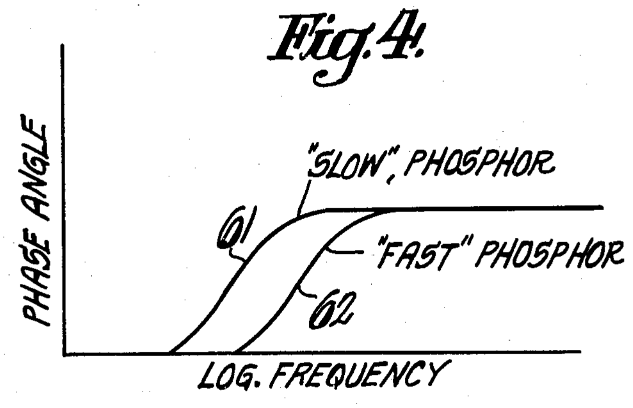
Fig. 4 illustrates a graphic representation to be described.

By virtue of the fact that phosphors, in general, have persistence, and since different phosphors have been found to have different decay time constants, and, therefore, different persistences, it will be appreciated that different phosphors may be chosen to have a different delay response to excitation. Figure 4 shows the phase responses of two different phosphors, as indicated by the curves 61 and 62. These curves labeled "slow" and "fast" phosphor, respectively, illustrate the fact that different phosphors having different decay characteristics will introduce different amounts of lag or phase shift in their light output with respect to their energization by alternating current, and as a function of the frequency of such alternating current. In other words, for an alternating current energization of given frequency, a phosphor having a long decay time characteristic, e. g., the slow phosphor represented by the curve 61, will introduce a greater phase shift in the signal than does a fast phosphor as indicated by the curve 62. This fact is exploited in accordance with the present invention, as indicated above, in providing novel means for causing an electron beam in a scanning cathode ray tube to travel accurately along predetermined paths.

Assuming, therefore, that the phosphor strips 40 and 41 in the apparatus of Figure 1 are, respectively, ultra-violet light emitting phosphors having different decay characteristics, such that the phosphor 40 is a fast phosphor and the phosphor 41 is a slow phosphor, the "tagging" (i. e., intensity modulation by high frequency alternating current signal) of the electron beam 34 permits accurate tracking of the beam along the color light emitting strips R, G and B. Moreover, in accordance with the present invention, automatic vertical interlace of successive field scanning rasters is effected in a simple fashion.

Assuming that, during a given television field interval, the electron beams 32, 34 and 36 are scanning the screen 38 as shown in Figure 2, ultra-violet light index signals will be received by the phototube device 54 and, since it is assumed that the green beam 34 is describing the wobble path which is centered about the fast ultra-violet phosphor 40, the ultra-violet index signals will be as shown by the pulses 64 in Figure 3*b*. For purposes of simplifying the description of the operation of this embodiment of the invention, it may be assumed that the fast phosphor 40 has substantially no delay, so that the ultra-violet light pulses 64 occur in time coincidence with the occurrence of the maximum brightness points 59′ along the beam path 34 (Figure 3*a*). During the next succeeding television field interval, however, when the beams 32, 34 and 36 are intended to scan along paths such that the green beam 34 wobbles with respect to the slow ultra-violet light phosphors 41, the ultra-violet light index pulses received by the phototube 54 will be delayed by an amount determined by the delay characteristic of the slow phosphor at the frequency of the tag signals. For purposes of simplicity, it is assumed in the following description that the slow ultra-violet light phosphor provides a delay of 180° at the tag frequency of 7.2 mcs., so that the pulses which would be produced by field interval No. 2 would be in the time positions shown by the pulses 65 in Figure 3*c*.

Before describing the overall operation of the arrangement of Figure 1, there will first be described a suitable tracking control apparatus in the form of a synchronous phase detector which is indicated in Figure 1 by the block 67 and which receives from the photocell 54, via an amplifier and limiting stage 68, the ultraviolet light-generated index signals which are compared in phase with a reference wave provided via a lead 69 from a phase switching circuit 70 which provides a selected wave of 3.6 mcs. energy derived from the oscillator 48. The synchronous phase detector 67, in turn, provides a correction signal at the lead 71 which is amplified in a stage 72 and applied to a beam position correction coil 73 which may, for example, comprise an electromagnetic winding capable of producing vertical positioning of the beams in the kinescope 20.

Figures 5, 6:
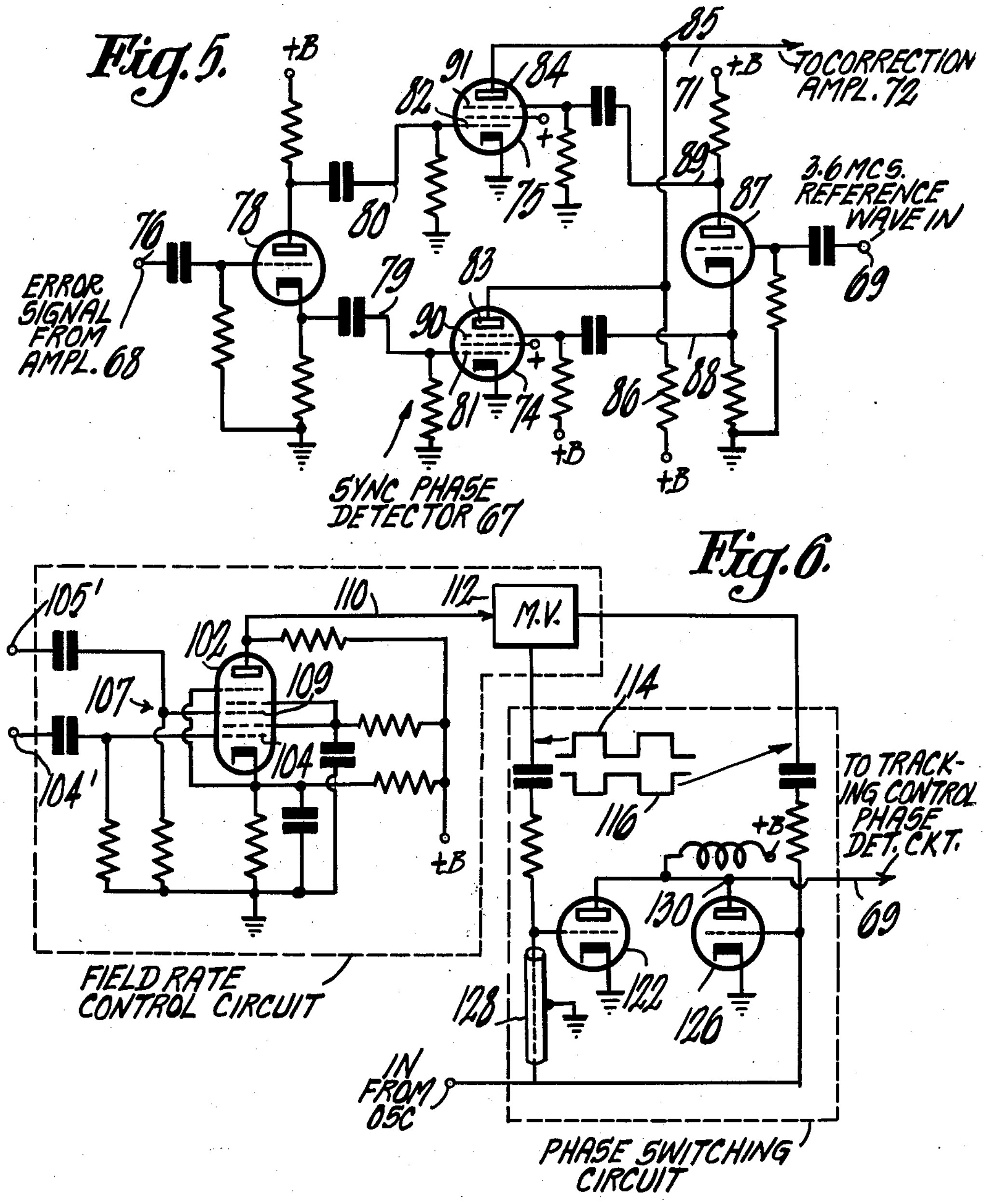
Figs. 5 and 6 are schematic diagrams of circuits useful in performing certain of the functions indicated in Fig. 1.

Figure 5 illustrates schematically a suitable circuit for performing the phase detection function of the block 67. Basically, the synchronous phase detector comprises a pair of comparator tubes 74 and 75, indicated as pentodes. The "error" signals derived from the photocell 54 and amplified and limited in the stage 68 are applied to the input terminal 76 of a phase splitter tube 78 which provides at its output leads 79 and 80, respectively, opposite phases of the electrical index signals provided by the photocell 54 in response to the ultra-violet light index pulses. Thus, opposite phases of the index waves are applied to the control electrodes 81 and 82 of the comparator tubes 74 and 75, respectively. The anodes 83 and 84 of the comparator tubes are joined to a common load terminal 85 at the upper end of a common load resistor 86. The terminal 85 is designated for connection via the lead 71 to the correction amplifier 72 of Figure 1.

A selected phase, to be described more fully hereinafter, of the 3.6 mcs. wave provided by the oscillator 74 is applied via a lead 69 to the input terminal of a phase splitter device 87.

The phase splitter 87 applies via its output leads 88 and 89, opposite phases of the input 3.6 mcs. reference wave to the suppressor grid electrodes 90 and 91 of the comparator tubes 74 and 75, respectively.

Figure 3:
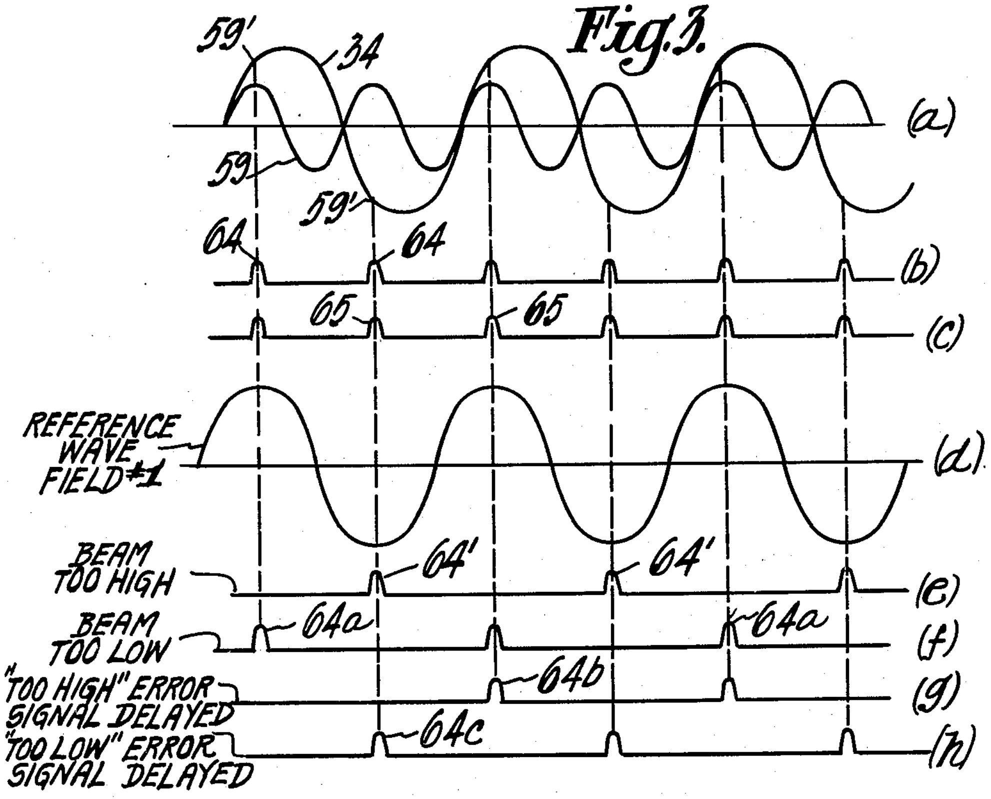
Fig. 3 illustrates, diagrammatically, certain wave forms to be described.

The operation of the synchronous phase detector circuit 67 of Figure 5 will now be described briefly and without reference to the phases of the input waves to the leads 69 and 76. Assuming that the correction amplifier 72 which applies the signal from the terminal 85 to the correction coil 73 has an even number of stages, so that no polarity reversal occurs between the terminal 85 and the correction coil and, assuming further than an increase in the positive potential at the terminal 85 produces a downward deflection of the beams by the electromagnetic field of the winding 73, the following action will occur in the phase detector: when the waves applied to the control electrodes and suppressor grid electrodes of the two comparator tubes are in phase, the comparator tubes will conduct more heavily, thereby producing a drop in potential at the terminal 85 with a resultant upward deflection of the electron beams in the kinescope 20. Conversely, when the waves applied to the suppressor and control grid electrodes of the comparator tubes are, respectively, out of phase, the current conduction of those tubes will decrease, with a resultant increase in positive potential at the terminal 85, so that the electron beams in the kinescope are deflected downwardly. It will further be understood that, if the input wave to the terminal 76 comprises pulses such as those shown at 64 or 65 in Figure 3 occurring at a 7.2 mcs. repetition rate, the output signal of the comparator tubes will not be affected. It should be noted, in the interest of completeness of description, that the comparator tubes 74 and 75 are so biased that, in the absence of input signal, the potential at the terminal 85 is of the proper value for maintaining the beams centrally positioned. Referring again to Figure 3, it will be seen that, during television field interval No. 1, when the beams 32, 34 and 36 are intended to scan along alternate groups of the color phosphor strips (i. e., those groups with which there are associated the fast phosphor index strips 40), the reference 3.6 mcs. wave applied to the terminal 69 of the synchronous phase detector will be a wave phased as shown by Figure 3*d*. The index signals applied to the terminal 76 of the phase detector 67 will comprise the pulses 64 of Figure 3*b*. Thus, with the beams scanning along the wobble paths shown in Figure 2, so that the wobble path 34 of the green beam is properly centered with respect to the strip 40 and so that the points of maximum intensity of the beam are symmetrically distributed above and below the index strip 40, as shown by the points 59′ in Figure 3*a*, the comparator tubes 74 and 75 will experience no change in conduction, by reason of the fact that the pulses 64 occur at a repetition rate of 7.2 mcs.

Assuming, for example, that the beams should erroneously shift upwardly slightly, so that the "negative" peaks of the wobble wave 34 occur closer to the index strip 40, while the "positive" peaks of the wobble wave are farther away from the strip 40, the index signal produced in the photocell circuit 54 will have a 3.6 mcs. component, as indicated by the pulses 64′ in Figure 3*e*. As will be seen, the pulses 64′ are 180° out of phase with respect to the reference wave of Figure 3*d*. Hence, the waves applied to the control grid and suppressor grid of each of the comparator tubes 74 and 75 will be substantially 180° out of phase, so that current conduction through those tubes is decreased, thereby increasing the positive potential at the terminal 85. Such increased positive potential effects, as has been explained, a downward deflection of the electron beams, which downward deflection will continue until the beam path 34 is again properly centered with respect to the index strip 40, at which time the index signal will comprise only the 7.2 mcs. pulses 64 of Figure 3*b*.

Assuming as a further example, and again in television field interval No. 1 when the beams are intended to scan along the groups of phosphor elements including the fast ultraviolet phosphors 40, that the beams are erroneously shifted downwardly from their proper positions, the index signals applied to the terminal 76 will be as shown by the pulses 64*a* (Figure 3*f*). In this event, and as may be noted by comparing Figures 3*d* and 3*f*, the waves applied to the control and suppressor grid electrodes of the comparator tubes will be in phase, so that conduction of both of those tubes will increase, resulting in a corresponding decrease in the positive potential at the terminal 85. This action, as pointed out, changes the current in the correction windings 73 to bring about an upward shifting of the beams to their proper positions.

The foregoing description has been directed solely to the matter of maintaining the beams properly "locked" on their respective horizontal lines. That is to say, it has been assumed thus far that the green beam is describing a wobble path 34 which is approximately centered with respect to the fast ultraviolet phosphor index strip 40. The apparatus of Figure 1, however, also performs the function of insuring that, during a given television field, the three electron beams will scan along only alternate groups of color phosphor strips. Specifically, the example assumed herein is that, during television field interval No. 1, the beams are intended to scan along those groups of color phosphor strips R, G and B which have associated therewith the fast ultraviolet phosphor index strips 40.

Assuming, therefore, by way of example, that during television field interval No. 1 described above, the beams should, as by reason of scanning nonlinearity, begin scanning along a group of color phosphor strips having associated therewith a slow ultra-violet phosphor index strip 41, the apparatus described will cause the beams to be shifted to the next adjacent group of strips. In accordance with this assumption, therefore, in which the green electron beam is, during field No. 1, wobbling about the slow index strip 41 as a center, the condition of the tracking control phase detector circuit will be an unstable one. That is, if the green path 34 is exactly centered on the strip 41, the index pulses will occur at a 7.2 mcs. rate (albeit shifted in phase from the proper position of the pulses 64, as shown by the pulses 65). As soon as the beams move slightly off center, however, as by reason of nonlinearity of a vertical deflection process, the phase detector 67 will serve to provide a correction signal, which when applied to the winding 73, will force the beams to the next adjacent group of phosphor strips. This action of the phase detector circuit 67 will be understood as resulting from the fact that the slow ultra-violet light-emitting phosphor strip 41 introduces a substantial phase shift in the index signals with respect to the reference wave shown in Figure 3*d*. Thus, if the scanning nonlinearity causes a slight upward shift of the beams, the resultant ultraviolet light index pulses (pulses 64′) will be shifted in phase, as shown by waveform *g* in Figure 3, wherein the delay pulses are indicated at 64*b*. The pulses 64*b* occur in time, as shown, in substantial coincidence with the positive peaks of the reference wave of Figure 3*d* so that the action of the phase detector circuit 67, by reason of the resulting increased conduction of its comparator tubes, is that of moving the beams downwardly even farther. Such downward shifting of the beams will continue until the green beam path 34 becomes centered about the next fast ultraviolet light-emitting phosphor strip 40 below the slow phosphor strip 41 which it had just left. Conversely, if the scanning nonlinearity mentioned is in the downward direction, the resulting ultra-violet light index pulses 64*a* would, after delay by the slow phosphor, occur at the positions shown by the pulses 64*c* in Figure 3*h*. These pulses, when applied to the phase detector 67, will cause it to produce a correction signal which moves the beams upwardly out of range of the slow ultraviolet strip 41, and until the green beam path 34 becomes centered about the next higher fast ultra-violet light phosphor 40.

As described thus far, it will be understood that the apparatus of Figure 1 serves, during television field interval No. 1, to cause the electron beams 32, 34 and 36 to scan along only the alternate groups of color phosphor strip-like elements R, G and B (i. e., those strips having associated therewith the fast ultra-violet light-emitting phosphor strips 40). At the end of the first television field interval, as sensed by a field rate control circuit 100, to be described, the phase of the reference wave applied via the phase switching circuit 70 to the phase detector 67 is reversed. That is, during television field interval No. 2, the reference wave applied to the terminal 69 of the phase detector 67 is 180° displaced in phase from the wave shown in Figure 3*d*. By reason of the reversed phase of the reference wave, it should be understood from the foregoing description of the operation of the apparatus during field No. 1 that the tracking control circuit will serve to cause the beams to scan only along those groups of color phosphor elements which have associated therewith the slow ultra-violet light-emitting phosphor strips 41. Without repeating the description of the operation of the tracking control arrangement, it may be noted that the line locking function of the circuitry is substantially the same as that which has been described (in view of the reversal of phase of the reference wave and the 180° phase shift introduced by the slow phosphor 41). Moreover, the tracking control arrangement will permit the beams to scan along only those groups of color phosphor strip-like elements which contain the slow strips 41.

Fig. 6 illustrates, within the dotted line area 100, circuitry suitable for performing the field sensing and control functions. A multi-grid tube 102 is biased to cut off by virtue of a positive potential applied to its cathode, as shown. The horizontal fly-back pulses from the horizontal deflection circuit are applied to a grid 104 via a conventional R-C coupling network connected to a terminal 104′. Pulses corresponding to the vertical or field rate are applied to a terminal 105′ and are differentiated by a network 107 before being applied to a grid 109 in the tube 102. When the two pulses on the grids occur simultaneously, as is the case on alternate television fields, the cut-off bias on the cathode of the tube 102 is overcome and a pulse appears at its anode. This pulse is applied via a lead 110 to a multi-vibrator 112 to trigger the latter at a 30 cycle per second rate (i. e., television frame rate).

The multi-vibrator 112 may be a free running multivibrator having a cycle equal to two television fields (i. e., one which provides positive and negative going pulses, each of which pulses has a time duration equal to one television field interval). Alternatively, the multi-vibrator may be of the monostable variety which is triggered to an unstable state by the coincidence pulse from the tube 102 and which reverts to its stable state at the end of a television field interval. In either event, the multi-vibrator 112 will provide, as will be understood by those skilled in the art, oppositely phased rectangular waves as illustrated by the wave forms 114 and 116. These wave forms are applied via coupling capacitors 118 and 120, respectively, and isolating resistors to the control grids of a pair of amplifier tubes 122 and 124 which comprise the phase switching amplifier 70.

The amplifier tubes 122 and 124 also receive on their respective control grid electrodes opposite phases of the color subcarrier frequency energy provided by the generator 48. By way of example, the 3.6 mcs. from the oscillator 48 may be applied via a suitable phase adjusting device directly to the control grid of the tube 122, while a portion of that wave is delayed by 180° as by a delay line 128 and applied to the control grid of the tube 124. By virtue of the application to the control grids of the tubes 122 and 124 of the oppositely phased rectangular waves 114 and 116, those tubes are alternately rendered conductive and non-conductive. That is to say, during a given television field, the tube 122 will be conductive, while the tube 124 is non-conductive and, during the next succeeding television field interval, the states of conduction of the two tubes will be reversed. The anodes of the tubes 122 and 124 comprising the phase switching amplifier are joined at a common load terminal 130 which is designated for connection via the lead 69 to the tracking phase detector circuit 67.

By virtue of the field rate switching action of the circuit 70, it will be understood that the reference wave applied to the phase comparator circuit of the tracking control arrangement 67 is reversed at a field rate in order that the operation of the tracking control circuit may properly accord with its required action as described.

Figures 7, 8:
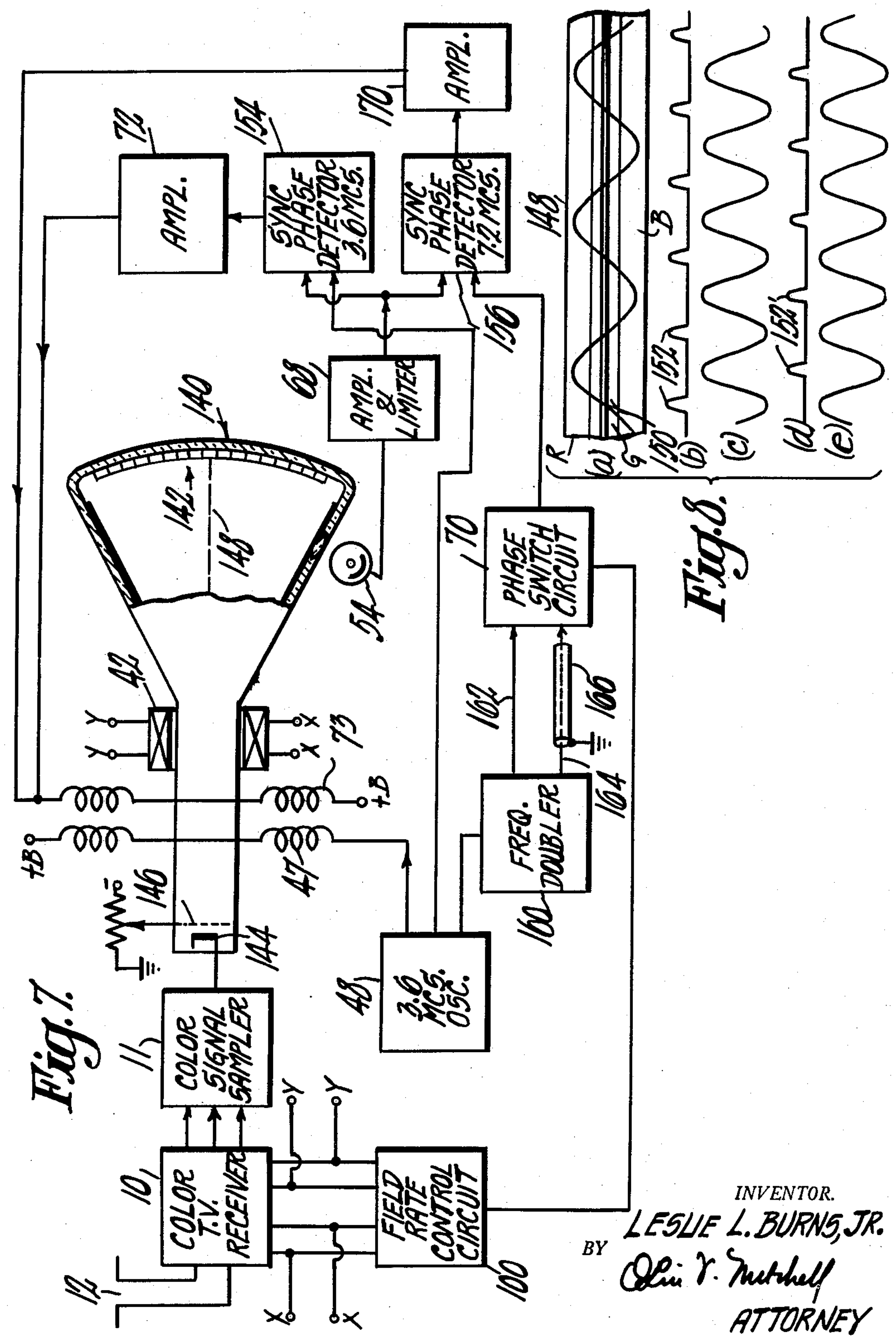
Fig. 7 illustrates, by way of a block diagram, another form of the present invention.
Fig. 8 illustrates certain wave forms to be described in connection with the arrangement of Fig. 7.

Figure 7 illustrates another form of the invention in accordance with which a plurality of electron beam components is caused to scan a raster with field interlacing. In the illustration, those components which correspond to and may be substantially identical to portions of the apparatus of Figure 1 are designated by the same reference numerals. The apparatus of Figure 7 includes a color kinescope 140 having a target screen 142 which may be substantially identical to the screen 38 of the tube of Figure 1 and means including a cathode 144 and control electrode 146 for forming and directing an electron beam 148 toward the screen. The electron beam 148 is caused to scan a raster on the screen 142 through the action of a deflection yoke 42 energized by horizontal and vertical deflection circuits (not shown) which are synchronized by signals derived from the receiver 10. In addition to its normal scanning movement, the electron beam 148 is subjected to a 3.6 mcs. vertical deflection, so that the beam is caused to wobble sinusoidally, the amplitude of such vertical wobble being sufficient to cause the beam to traverse successively the red, green and blue color light-emitting phosphor strips R, G and B of the screen. This action will be better understood from a showing of Figure 8*a*, wherein the electron beam path is indicated by reference numeral 148. Each group of color phosphor elements includes a red, a green and a blue strip and, additionally, an ultraviolet light-emitting phosphor index element. Alternate groups of color phosphor strips are provided with fast ultraviolet light strips such as the ones indicated by reference numeral 150, while intervening groups are provided with slow ultraviolet light phosphor strips (not shown).

The beam 148 is intensity-modulated sequentially with red, green and blue video signals through the action of a signal sampler 11 which may be understood as being in the nature of a commutator in action, although it may, in practice, comprise a plurality of electronic tube gate circuits which are keyed on in the appropriate order.

As the beam is caused to wobble in the described fashion to the action of a wobble coil 47 which is energized by a 3.6 mcs. oscillator 48, each crossing of the index strip 150 produces a pulse 152 of ultraviolet light which is received by a phototube device 54 and converted into a corresponding electrical signal which is amplified and limited by a stage 68. As will be noted from Figure 8*b*, the pulses 152 occur at a repetition rate of 7.2 mcs., since the wobble path 148 crosses the index element 150 twice per cycle of wobble. The amplified and limited index signals from the circuit 68 are applied simultaneously to a first synchronous phase detector 154 which operates at 3.6 mcs. and a second synchronous phase detector 156 which operates at 7.2 mcs. That is to say, the phase detector 154 which serves the purpose of locking the electron beam path 148 onto an ultraviolet light-emitting strip such as the strip 150, is provided with a suitable phase of 3.6 mcs. from the oscillator 148 via a lead 158. The phase detector 154 may be substantially the same as that shown at Figure 5, so that it will be understood that, if the electron beam is properly centered with respect to an index strip, the index pulses 152 occurring at a 7.2 mcs. rate will cause no change in the output of the phase detector 154, so that the beam will remain centered. If, however, the beam path should erroneously be moved upwardly or downwardly from its proper position, a 3.6 mcs. component of the ultra-violet light signal will cause the phase detector 154 to provide a correction signal at its output, which correction signal will, by virtue of its polarity and amplitude, cause the electron beam 148 to be shifted to its proper position.

The synchronous phase detector 156, on the other hand, serves to insure, that during a given television field interval, the electron beam 148 scans only those groups of color light-emitting phosphor elements having associated therewith an index element of the proper category. That is, during television field interval No. 1, the action of the phase detector 156 serves to cause the beam to scan only alternate groups of color phosphor strips (i. e., those having fast index strips) and, during television field No. 2, to scan only the intervening color phosphor groups (i. e., those having slow ultraviolet light-emitting phosphor index strips). A frequency doubler 160 serves to multiply the 3.6 mcs. wave from the oscillator 48 by a factor of 2 to provide at its output leads 162 and 164 waves of 7.2 mcs. One of the waves (i. e., the wave from the lead 162) is applied directly to a phase switching circuit 70, while the wave from lead 164 is delayed by 180° through the action of a delay line 166 and then applied to the phase switching circuit 70. The circuit 70 is controlled at a television field rate by the control circuit 100. Thus, the phase switching circuit 70 applies, during television field interval No. 1, a wave such as that shown in Figure 8*c* to the phase detector 156.

Specifically, the wave applied via the lead 162 and the phase switching circuit 70 to the phase detector 156 during television field interval No. 1 is that wave shown in Figure 8*c*, which wave is, as may be seen, 180° out of phase with respect to the index pulses 152. That is, the negative peaks of the wave of Figure 8*c* occur at the time of the positive-going pulses 152. The phase detector 156 is so biased that its current conduction is zero when the wave of Figure 8*c* is applied to it at the same time that it receives pulses corresponding to pulses 152. Thus, the output of the phase detector 156 which is amplified by a stage 170 and applied to the beam position correction coil 73 remains unchanged. If, however, the electron beam 148 should erroneously begin a scanning line centered with respect to a slow ultra-violet light emitting phosphor strip during television field No. 1, the pulses provided and received by the photocell for application to the phase detector 156 will have the phase shown by the pulses 152′ in Figure 8*d*. The pulses 152′ are, as may be seen, in phase with the wave of Figure 8*c*, so that current conduction of the phase detector is brought to a maximum value. The signal thus produced by the phase detector is amplified by the stage 170 and applied to the beam position correction coil 73 for moving the beam downwardly to the next group of phosphor elements until it is centered about the fast ultra-violet light emitting phosphor strip associated with that group.

During television field No. 2, the phase switching circuit 70 applies to the phase detector 156 a reference wave of the pulse shown in Figure 8*e*. Since the beam is intended during that television field interval to scan along those groups of phosphor elements having associated with them the slow index strips, the normal pulses received by the phase detector from the amplifier and limiter 68 will be pulses such as those shown in Figure 8*d*, which pulses are substantially 180° out of phase with respect to the wave of Figure 8*e*. Thus, the phase detector output is zero, so that no change is made in the position of the beam. When, however, the beam arroneously begins a scanning line interval on a fast phosphor index element, the output index pulses of the photocell which are received by the phase detector will have the phase of the pulses 152 in Figure 8*b*, which pulses are in phase with the reference wave of Figure 8*e*, so that current conduction in the phase detector is increased to move the beam downwardly to the next group of color phosphor elements until the beam wobble path is centered about a slow ultraviolet light-emitting phosphor strip.

While, in describing the principles of the present invention, there have been shown two specific forms which the invention may take in practice, one of which includes a plurality of electron beams, one of which is tagged to identify it, it should be borne in mind that other arrangements may be employed in practicing the invention. For example, an arrangement involving three beams, by way of illustration, may be employed without tagging one of the beams. In such event, the "guiding" or control beam of the trio may be caused to provide the index signals necessary for line locking and field interlace purposes and the other two beams may be maintained blanked off during the first part of each line scanning interval for a sufficient time to permit the guiding beam to become locked about the proper ultraviolet light-emitting phosphor strip.

In the interest of completeness of description, it will be noted that ultra-violet light-emitting phosphors suitable for use, respectively, as the slow and fast phosphors are as follows, for example:

Slow: $CaMgPO_4$:Ce (known in the art as "P-15"; calcium-magnesium-phosphate, cerium-activated)

Fast: $KBaPO_4$:Ce (potassium-barium-phosphate, cerium-activated)

Having thus described my invention, what I claim as new and desire to secure by Letters Patent is:

1. Color image reproducing apparatus which comprises: a color kinescope having a target screen made up of a plurality of groups of horizontally oriented light-emitting strip-like elements of respectively different color characteristics, each group having associated therewith a cathodoluminescent index element which is adapted to produce an index signal in response to electron impingement and which is located in a fixed position relative to one of said color elements of a certain color characteristic; the index elements in said fixed positions in alternate groups of color elements having a certain delay characteristic and the index elements in said fixed positions in intervening groups of color elements having a different delay characteristic, such that index signals produced by said index elements of such intervening groups are of a different phase with respect to a reference from the phase of index signals produced by said index elements of said alternate groups, said kinescope also having means for directing a plurality of electron beam components towards said screen; deflection means for causing said beam components to scan successive field rasters on said screen, the line of said rasters being substantially parallel to said strip-like color elements and to said index elements; means associated with said index elements for deriving index signals therefrom as said beam components scan said screen; and means operative at a field raster rate and responsive to the phase of said index signals for causing such beam components to scan only alternate groups of color elements during a first field and to scan only said intervening groups of color elements during the next succeeding field interval.

2. Color image reproducing apparatus which comprises: a color kinescope having a target screen made up of a plurality of groups of horizontally oriented light-emitting strip-like elements of respectively different color characteristics, each group having associated therewith an index element which is adapted to produce an index signal in response to electron impingement and which is located in a fixed position relative to one of said color elements of a certain color characteristic; the index elements in said fixed positions in alternate groups of color elements having a certain delay characteristic and the index elements in said fixed positions in intervening groups of color elements having a different delay characteristic, such that index signals produced by said index elements of such intervening groups are of a different phase with respect to a reference from the phase of index signals produced by said index elements of said alternate groups, said kinescope also having means for directing a plurality of electron beam components toward said screen; deflection means for causing said beam components to scan successive field rasters on said screen, the line of said rasters being substantially parallel to said strip-like color elements and to said index elements; means associated with said index elements for deriving index signals therefrom as said beam components scan said screen; means operative at a field raster rate and responsive to the phase of said index signals for causing such beam components to scan only alternate groups of color elements during a first field and to scan only said intervening groups of color elements during the next succeeding field interval; a source of video signals representative of said respectively different color characteristics of an image to be reproduced; and means for applying signals from said source to said kinescope for modulating respective ones of said beam components with video signals representative of the color characteristics of the color elements which said beam components respectively scan.

3. Color image reproducing apparatus which comprises: a color kinescope having a target screen made up of a plurality of groups of horizontally oriented light emitting strip-like elements of respectively different color characteristics, each group having associated therewith an index element which is adapted to produce an index signal in response to electron impingement and which is located in a fixed position relative to one of said color elements of a certain color characteristic, the index elements in said fixed positions in alternate groups of color elements having a certain delay characteristic and the index elements in said fixed positions in intervening groups of color elements having a different delay characteristic, such that index signals produced by said index elements of such intervening groups are of a different phase with respect to a reference from the phase of index signals produced by said index elements of said alternate groups, said kinescope also having means for directing a plurality of electron beam components toward said screen; deflection means for causing said beam components to scan successive field rasters on said screen, the lines of said rasters being substantially parallel to said strip-like color elements and to said index elements; means associated with said index elements for deriving index signals therefrom as said beam components scan said screen; phase comparator means for receiving such index signals from said last-named means and for comparing the phase of said index signals with a reference to provide an output signal indicative of the phase of such index signals with respect to said reference; auxiliary deflection means associated with said tube and responsive to said output signal of said phase comparator means for controlling the vertical positioning of said beam components; and means operative at a field raster rate for changing the phase of said reference such that said auxiliary deflection means causes such beam components to scan only alternate groups of color elements during a first field and to scan only said intervening groups of color elements during the next succeeding field.

4. Color image reproducing apparatus which comprises: a color kinescope having a target screen made up of a plurality of groups of horizontally oriented light emitting strip-like elements of respectively different color charactertistics, each group having associated therewith an index element which is adapted to produce an index signal in response to electron impingement and which is located in a fixed position relative to one of said color elements of a certain color characteristic, the index elements in said fixed positions in alternate groups of color elements having a certain delay characteristic and the index elements in said fixed positions in intervening groups of color elements having a different delay characteristic, such that index signals produced by said index elements of such intervening groups are of a different phase with respect to a reference from the phase of index signals produced by said index elements of said alternate groups, said kinescope also having means for directing a plurality of electron beam components toward said screen; deflecting means for causing said beam components to scan successive field rasters on said screen, the lines of said rasters being substantially parallel to said strip-like color elements and to said index elements; means associated with said index elements for deriving index signals therefrom as said beam components scan said screen; a source of reverence wave of a certain frequency; phase comparator means operatively associated with said source and with said index signal-deriving means for comparing the phase of said index signal with a wave from said source to provide an output signal; auxiliary deflection means for controlling the vertical positioning of said beam in response to said output signal of said phase comparator means; and means coupled to said source of reference wave and to said phase comparator means and operative at a field rate for shifting the phase of said reference wave during alternate fields thereby to change the response of said phase comparator means during alternate fields, such that said beam components are caused to scan only alternate groups of color elements during alternate fields and to scan only intervening groups of color elements during intervening fields.

5. Color image reproducing apparatus which comprises: a color kinescope having a target screen made up of a plurality of groups of horizontally oriented light emitting strip-like elements of respectively different color characteristics, each group having associated therewith an index element which is adapted to produce an index signal in response to electron impingement and which is located in a fixed position relative to one of said color elements of a certain color characteristic, the index elements in said fixed positions in alternate groups of color elements having a certain delay characteristic and the index elements in said fixed positions in intervening groups of color elements having a different delay characteristic, such that index signals produced by said index elements of such intervening groups are of a different phase with respect to a reference from the phase of index signals produced by said index elements of said alternate groups, said kinescope also having means for directing a plurality of electron beam components toward said screen; deflection means for causing said beam components to scan successive field rasters on said screen, the lines of said rasters being substantially parallel to said strip-like color elements and to said index elements; means associated with said index elements for deriving index signals therefrom as said beam components scan said screen; a source of reference wave of a certain frequency; phase comparator means operatively associated with said source and with said index signal-deriving means for comparing the phase of said index signal with a wave from said source to provide an output signal; auxiliary deflection means for controlling the vertical positioning of said beam components in response to said output signal of said phase comparator means; and means coupled to said source of reference wave and to said phase comparator means and operative at a field rate for shifting the phase of said reference wave during alternate fields thereby to change the response of said phase comparator means during alternate fields, such that said beam components are caused to scan only alternate groups of color elements during alternate fields and to scan only intervening groups of color elements during intervening fields; a source of video signals respectively representative of different ones of said color characteristics of an image to be reproduced; and means for applying video signals from said source to said kinescope for modulating respective ones of said beam components with video signals representative of the color characteristics of the color elements which said beam components scan.

6. Color image reproducing apparatus which comprises: a color kinescope having a target screen made up of a plurality of groups of horizontally oriented light-emitting strip-like elements of respectively different color characteristics, each group having associated therewith a cathodo-luminescent index element which is adapted to product a light index signal in response to electron impingement and which is located in a fixed position relative to one of said color elements of a certain color characteristic; the index elements in said fixed positions in alternate groups of color elements having a certain delay characteristic and the index elements in said fixed positions in intervening groups of color elements having a different delay characteristic, such that index signals produced by said index elements of such intervening groups are of a different phase with respect to a reference from the phase of index signals produced by said index elements of said alternate groups, said kinescope also having means for directing a plurality of electron beam components toward said screen; deflection means for causing said beam components to scan successive field rasters on said screen, the line of said rasters being substantially parallel to said strip-like color elements and to said index elements; light-responsive means associated with said index elements for deriving electrical index signals from said light index signals as said beam components scan said screen; and means operative at a field raster rate and responsive to the phase of said electrical index signals for causing such beam components to scan only alternate groups of color elements during a first field and to scan only said intervening groups of color elements during the next succeeding field interval.

7. Color image reproduction apparatus which comprises: a color kinescope having a target screen made up of a plurality of horizontally oriented strip-like elements of different color light emitting characteristics and a plurality of horizontally oriented index elements associated therewith, in a fixed pattern with respect to certain ones of said strip-like elements, for producing index signals in response to electron impingement, alternate ones of said index elements having a first delay characteristic such that index signals produced thereby are delayed a certain amount with respect to electron impingement thereon, the intervening ones of said index elements having a different delay characteristic from that of said alternate index elements and means for directing an electron beam toward said screen; deflection means for causing said beam to scan, during a television field interval, a raster comprising a plurality of horizontal line scans across said screen; means associated with said kinescope for causing such beam to wobble vertically and at a fixed frequency during such line scanning movement such that it repeatedly crosses and recrosses an index element during a line scan; means for deriving index signals from said index elements as said beam scans said screen; means responsive to the phase of said index signals with respect to a reference wave for controlling the vertical positioning of said beam; and means operative at a television field rate for shifting the phase of said reference during alternate fields such that said beam is caused to wobble about only alternate ones of said index elements as successive axis during alternate field intervals and to wobble about only intervening ones of said index elements axes during intervening field intervals.

8. The invention as defined by claim 7 including means for tagging said electron beam with a signal of a certain frequency different from the frequency of such wobble frequency, said reference wave being a wave of said wobble frequency and said means for controlling the vertical positioning of said beam in response to the phase of said index signals comprising a phase comparator operative at said wobble frequency.

9. The invention as defined by claim 7 wherein said means for controlling the vertical positioning of said beam in response to the phase of said index signal comprises a synchronous phase detector operative at twice said wobble frequency and wherein said reference is a wave of twice said wobble frequency and whose phase bears a predetermined relation to the phase of the wobble path followed by said beam.

References Cited in the file of this patent

UNITED STATES PATENTS

| | | |
|---|---|---|
| 2,671,129 | Moore | Mar. 2, 1954 |
| 2,677,723 | McCoy | May 4, 1954 |
| 2,713,606 | Sziklai | July 19, 1955 |
| 2,718,546 | Schlesinger | Sept. 20, 1955 |